Jan. 17, 1939.　　　　　L. E. LA BRIE　　　　　2,144,024
BRAKE
Filed Aug. 16, 1935　　　　7 Sheets-Sheet 1

INVENTOR.
LUDGER E. LaBRIE
BY Jerome R. Cox
ATTORNEY

Jan. 17, 1939.  L. E. LA BRIE  2,144,024
BRAKE
Filed Aug. 16, 1935  7 Sheets—Sheet 2

INVENTOR.
LUDGER E. LABRIE
BY Jerome R. Cox
ATTORNEY

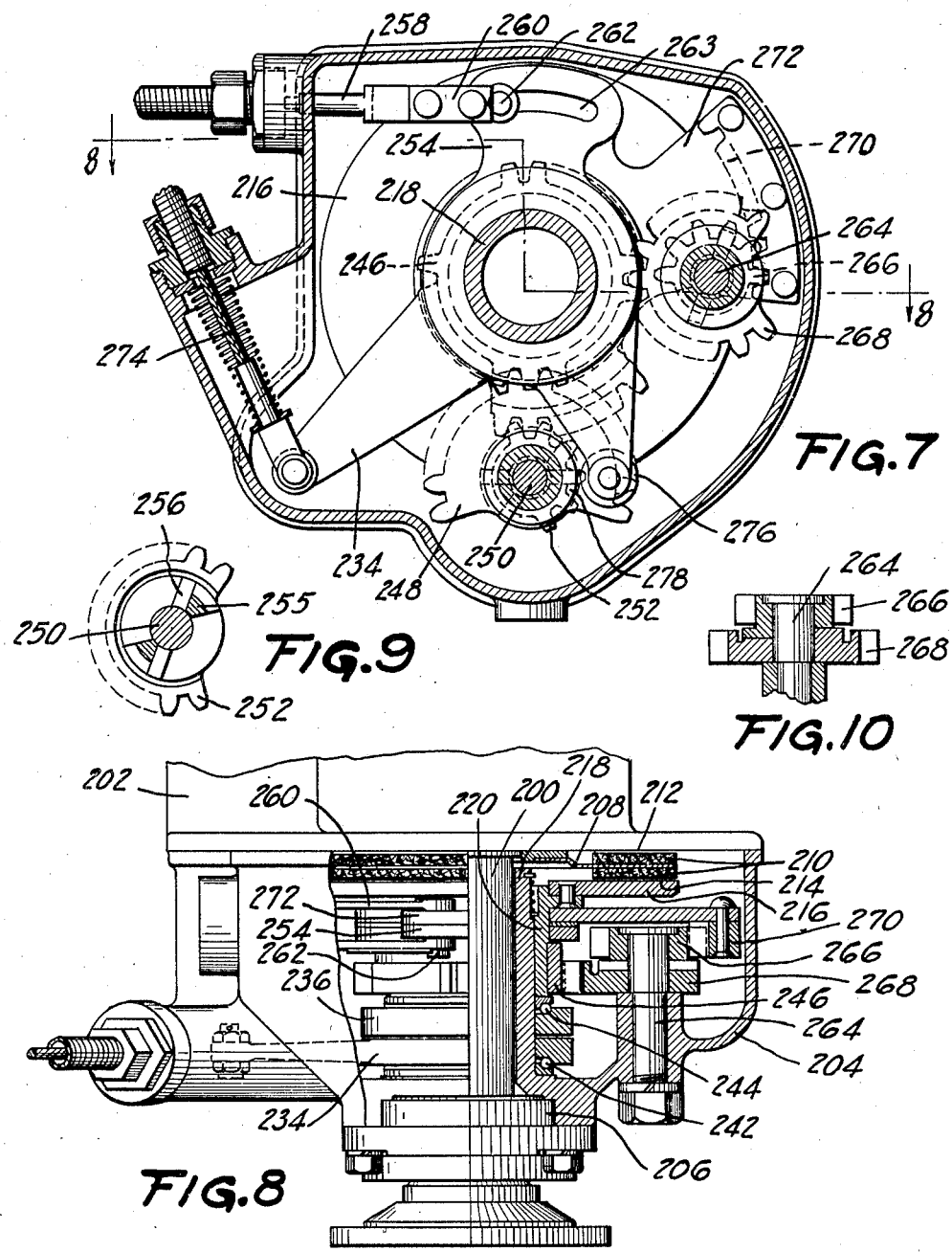

Jan. 17, 1939.   L. E. LA BRIE   2,144,024
BRAKE
Filed Aug. 16, 1935   7 Sheets-Sheet 5

INVENTOR.
LUDGER E. LaBRIE
BY Jerome R. Cox
ATTORNEYS.

Jan. 17, 1939.　　　L. E. LA BRIE　　　2,144,024
BRAKE
Filed Aug. 16, 1935　　　7 Sheets-Sheet 6

INVENTOR.
LUDGER E. LaBRIE
BY Jerome A. Cox
ATTORNEY

Jan. 17, 1939.   L. E. LA BRIE   2,144,024
BRAKE
Filed Aug. 16, 1935   7 Sheets-Sheet 7

INVENTOR.
LUDGER E. LA BRIE
BY
Jerome R. Cox
ATTORNEY

Patented Jan. 17, 1939

2,144,024

UNITED STATES PATENT OFFICE 2,144,024

BRAKE

Ludger E. La Brie, South Bend, Ind., assignor to Bendix Products Corporation, South Bend, Ind., a corporation of Indiana Application August 16, 1935, Serial No. 36,477

14 Claims. (Cl. 188—140)

This invention relates to brakes for motor vehicles and more particularly to power means for operating vehicle brakes, where the power is derived from some rotating part of a vehicle, preferably a drive member which is in constant drive relation with the vehicle wheels.

As is well understood in the art, the operation of vehicle brakes requires considerable expenditure of energy upon the part of the operator, particularly where the vehicle is of the heavier type. The invention has to do with providing a mechanism for employing the energy of the moving vehicle for applying the brakes, the mechanism including an operator controlled friction device adapted to take off a brake operating torque from the propeller shaft of a vehicle or some other rotating part from which a brake operating torque may be obtained. More particularly the invention has to do with the employment of a disc type friction device for developing torque and novel linkage and apparatus for controlling the frictional engagement of the disc device and for converting the torque derived from the friction device and transmitting the same to brake operating linkage.

Accordingly, an object of the invention is to provide an improved friction device including a control therefor for developing a brake operating torque and means for transmitting the torque to the vehicle brakes.

Another object of the invention is to provide a friction device of the rotating disc type which device may transfer torque from the rotary part of the device to energize a vehicle wheel brake linkage to any desired degree in accordance with the actuation of a control member.

A further object of the invention is to provide in a friction device of the disc type for developing energy for actuating wheel brakes, a control therefor which will require a movement or energy which may always be proportional to the energy to be applied to the wheel brakes by the friction device.

A still further object of the invention is to provide various modified forms of apparatus for accomplishing some or all of the above objects, among others, as will hereinafter appear, all of which modified forms readily lend themselves to commercial use as will readily appear.

The above and other objects and novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein like reference numerals indicate like parts:

Figure 7 is an end view of the form of Figure 6, the shaft and housing being cut away;

Figure 8 is a top view of the form of Figure 6, a portion of the casing being cut away and a part of the mechanism being shown in section;

Figure 9 illustrates an end view of a gear and cooperating member of the modification of Figure 6;

Figure 10 illustrates a section taken through the gear and member of Figure 9;

Figure 1:
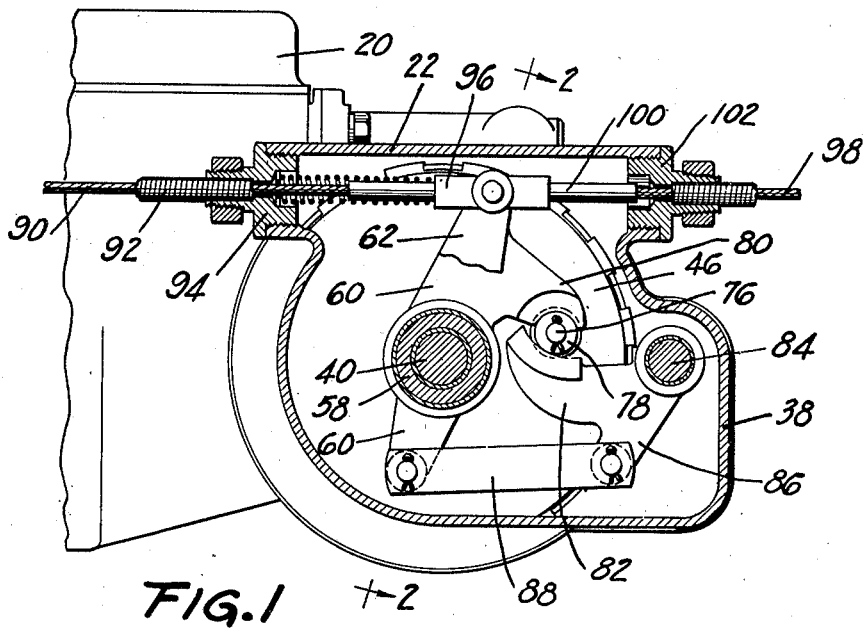
Figure 1 is a side view partly in section of a power brake operator illustrating the general arrangement thereof. The parts in section are taken on the line 1—1 shown in Figure 2.
Figure 2:
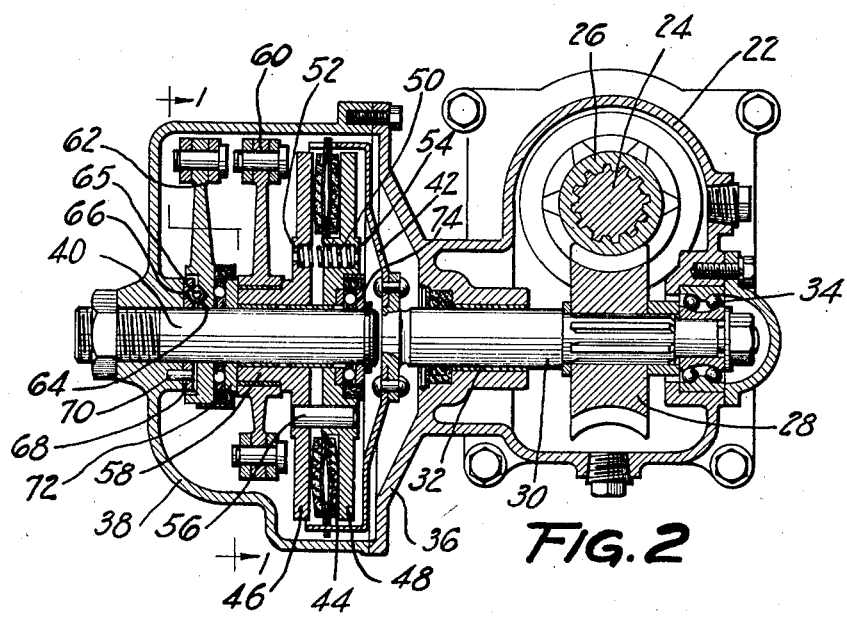
Figure 2 is a section taken on the line 2—2 of Figure 1 showing the details thereof.

Referring to the drawings and more particularly the modification illustrated in Figures 1 and 2, there is shown a portion of an automotive vehicle transmission gear box 20, to the rear of which is secured a housing 22 enclosing a suitable worm and worm gear drive. Within the housing and splined to the main drive shaft 24 of the vehicle is provided a multi-thread worm 26 meshed with a worm wheel 28 secured and splined upon a short transverse shaft 30 carried in bearings 32 and 34 in the housing 22.

On one side of and secured to a flange 36 on the housing 22 is a second housing 38 which carries therein a short stationary stud shaft 40 coaxial with, but terminating short of, the shaft 30, which latter shaft extends part way into the second housing 38. A spider 42 adapted to carry a pair of oppositely dished annular friction discs 44 splined thereto, but free to move axially, is secured for rotation with the short transverse shaft 30 carrying the worm wheel 28.

Mounted on the short stub shaft 40 is a pair of relatively stationary friction discs 46 and 48, which, although free to rotate, are constrained to rotate through a small angle only as will hereinafter appear. The friction discs are provided with spacing springs 50 set in recesses 52 and 54 and pins 56 which prevent relative rotation between the discs. The disc 46 is also provided with a sleeve 58 on which is carried a rock lever 60 which is free to rotate relative to the sleeve.

Between the disc 46 and its sleeve 58 there is provided a device for effecting an axial thrust against disc 46 to cause discs 46 and 48 to grip the rotating annular friction members 44. For accomplishing this result, an operating lever 62 is loosely journalled on the stub shaft 40 and is provided with suitable conical sockets 64 which are complementary to similar sockets 66 arranged in a thrust collar 68 which is held against rotation relative to the stub shaft 40 by a pin 70. Thrust balls 65 are jointly received in the sockets 64 and 66 so that relative rotation between the lever 62 and collar 68 spreads the same axially. A suitable thrust bearing 72 is positioned between the lever 62 and the sleeve 58 of the friction disc 46 and a second thrust bearing 74 is positioned on the end of the stub shaft to carry the axial reaction of the friction disc 48.

Carried by the friction disc 46 is a crank pin 76 carrying a roller 78. Bearing against this roller is a projecting arm 80 on lever 60 and a second lever 82 individually fulcrumed on a pin 84 carried in the housing 38. The lever 82 is provided with a bell crank arm 86 which is connected by a link 88 to a lower extension of the lever 60.

For operating the control lever 62 which is fragmentally illustrated in Figure 1, a flexible cable 90 is provided which passes through a hollow flexible tube 92 secured to the casing by a threaded hollow plug member 94. The cable is secured to the lever by means of a clevis 96 and release position is normally maintained by a spring concentrically arranged around the cable 90 between the clevis 96 and the plug 94.

Power is derived from the device by a cable 98 secured by a clevis 100 to lever 60 and the cable suitably extends out of the housing through a hollow plug 102 to make connections with any suitable brake linkage connected to wheel brakes.

The operation will be easily understood from the foregoing, the transmission gear shaft 24 constantly driving through worm 26 and gear 28, the spider 42 and annular friction discs 44, so that so long as the vehicle moves or tends to move torque is transmitted to friction discs 44. Tensioning the cable 90, which may be suitably connected to a brake pedal, will cause the rotation of lever 62, causing the balls 65 which are retained in the conical sockets 64 and 66, to climb out and spread the parts. Such action thrusts the discs 46 and 48 into engagement with the rotating discs 44, thus producing or transferring torque to the discs 46 and 48 and to crank pin 76. If the rotation be counterclockwise, lever 60 is rotated directly counterclockwise, tensioning cable 98 to apply the brakes. Should rotation of the friction discs be clockwise, rotation of lever 60 is still counterclockwise since the torque is transmitted through the lever crank 82 and link 88. Thus, regardless of rotation direction, a brake application of any degree is produced by the rotation of lever 62 to a corresponding degree.

Figure 3:
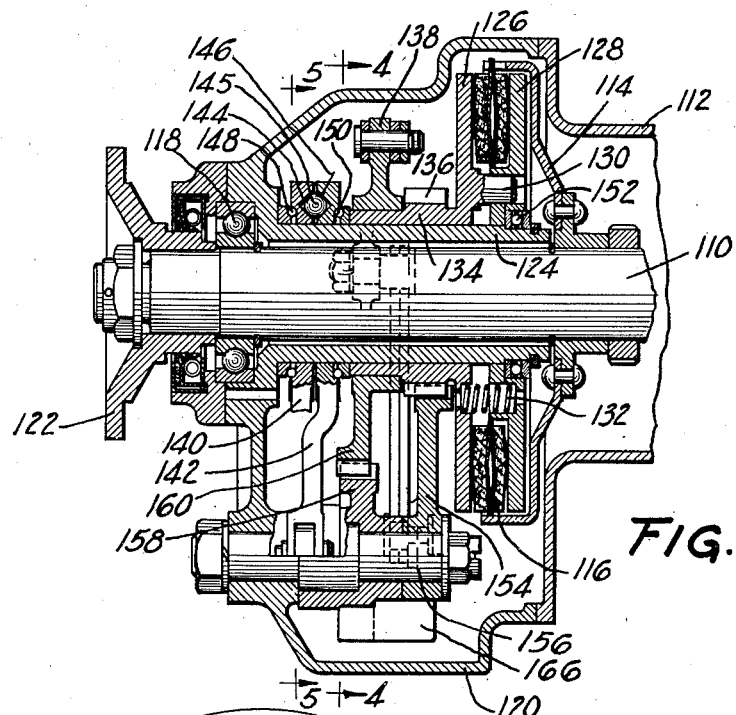
Figure 3 is a section through a modified form of power operator arranged coaxial on a vehicle transmission shaft.
Figure 4:
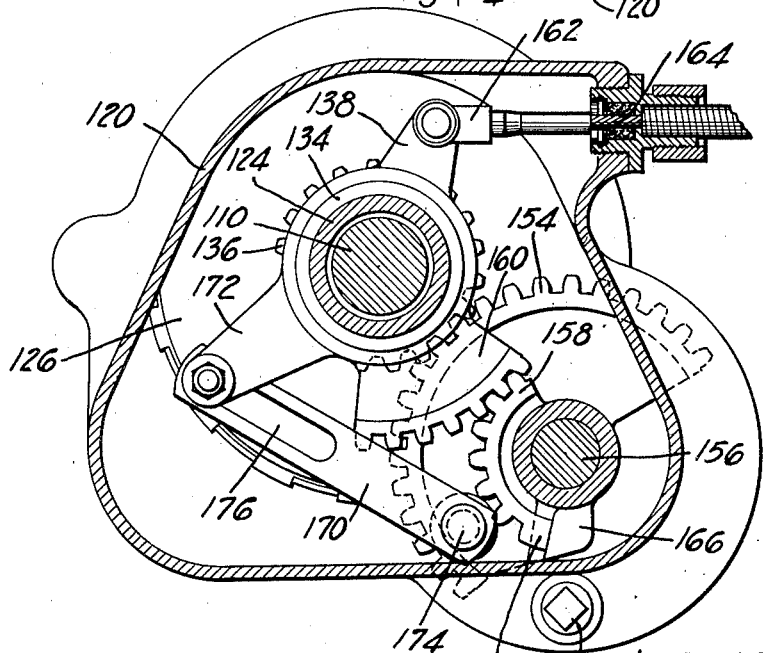
Figure 4 is a transverse section taken on the line 4—4 of Figure 3 illustrating the details thereof.
Figure 5:
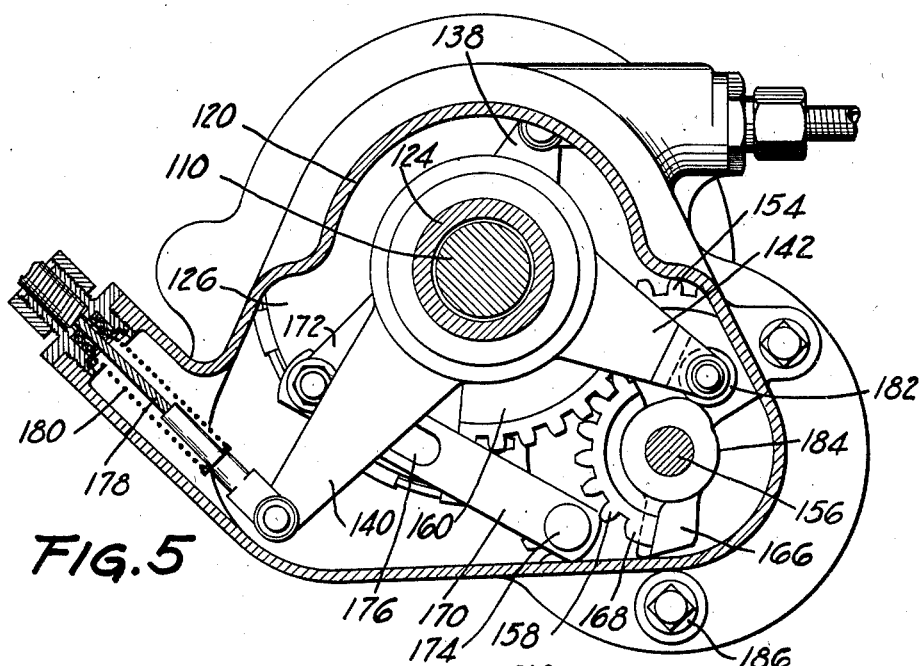
Figure 5 is a transverse section taken on the line 5—5 of Figure 3 illustrating further details thereof.
Figure 6:
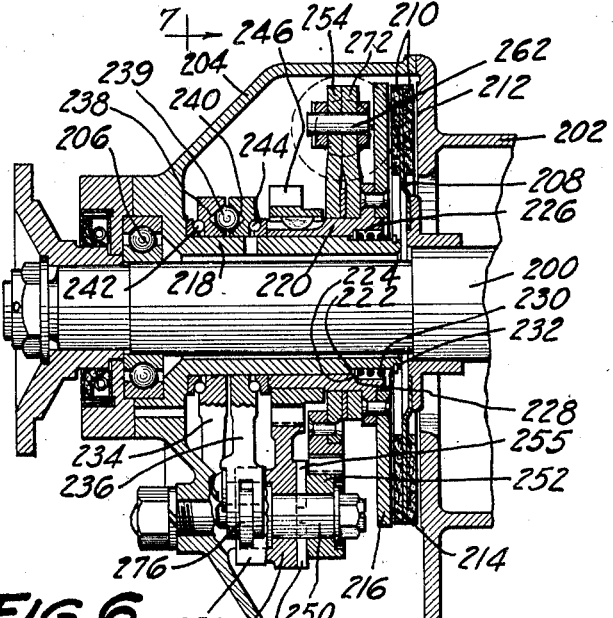
Figure 6 is a longitudinal section taken through another modified form of power operator, the same being arranged coaxial on a vehicle transmission shaft.

Referring to Figures 3, 4 and 5, in the drawings wherein a modified form of power operator is shown, it will be seen that the same is mounted coaxial about a drive shaft 110 extending from the rear of the transmission gear box 112. The shaft 110 is splined at its inner end to carry a spider 114 which carries a pair of annular friction discs 116, the same being free to move axially with respect to the spider. The outer end of the shaft is carried in a bearing 118 mounted in a gear box housing extension 120, and the free end of the shaft carries the usual flange 122 for driving a universal joint and propeller shaft, not shown.

In the present form, the stationary stub shaft 124 is hollow in form, permitting the shaft 110 to pass therethrough, and is preferably formed as a part of the housing 120.

On the hollow stub shaft are a pair of relatively stationary friction discs 126 and 128, pinned together as at 130, and urged apart by springs 132 set in suitable recesses, which discs are adapted to engage the discs 116. The friction disc 126 is provided with a sleeve 134 having gear teeth 136 thereon and a lever 138 freely and rotatably mounted thereon. Between the end of the sleeve and the housing, and rotatably mounted on the hollow stub shaft are a pair of levers 140 and 142 having collars with complementary conical sockets 144 and 146 with balls 145 jointly carried therein. Suitable thrust bearings 148 and 150 are provided on either side of the lever collars, and an end thrust bearing 152 is provided to carry the axial thrust of the discs 126 and 128.

In order to transmit brake operating torque from the friction discs 126 and 128, the gear teeth 136 carried by the sleeve 134 mesh with a sector gear 154 which is freely rotatably carried on a stub shaft 156 secured to the housing 120. Mounted on the same stub shaft 156 is a second smaller sector gear 158 which is freely rotatable thereon, and which meshes with a third sector gear 160 which forms an integral part of the lever 138 journalled on the sleeve 134. The lever 138, by means of a suitable clevis 162, is attached to the brake operating cable 164.

In order that the sector gear 154 may drive the sector gear 158 when rotating in a clockwise direction, an arm or lug 166 is provided, extending parallel to the stud axis 156 so as to engage a shoulder 168 on the sector gear 158. It will thus appear that counterclockwise rotation of the friction discs 126 and 128 will rotate sector gears 154 and 158 clockwise and sector gear 160 counterclockwise so as to tension the cable 164. When the friction discs rotate in a clockwise direction, the lever 138 carrying sector gear 160 is also rotated counterclockwise by reason of a link 170 which is connected to lever 138 by an integral arm 172, and to a crank pin 174 on sector gear 154. A slot 176 in the link 170 permits overrunning of the link with respect to the lever arm 172 during counterclockwise rotation of the friction discs and the arm or lug 166 on the sector gear 158 obviously overruns the shoulder 168 on sector gear 158 when the friction discs rotate clockwise.

As best shown in Figure 5, actuation of the brake operator is accomplished by rotation of lever 140 relative to lever 142 so as to produce axial thrust. A flexible cable 178 having a return spring 180 threaded thereon is secured to the lever and adapted to extend out of the housing to a brake pedal or suitable control. Since actuation results from the relative rotation of levers 140 and 142, lever 142 is extended and provided with a roller 182 engaging a cam 184 integrally carried by the sector gear 158. As the sector gear rotates and the cam permits the lever 142 to move clockwise, a certain amount of follow-up or "feel" is transmitted to the operating lever 140 through the balls 145, so that an operator may feel the extent of movement of the brake linkage.

The above modification is one adapted to be run in oil and no particular partition is therefor provided between the transmission gears and the friction device and a suitable drain plug 186 is provided in the casing 120 at a low point so that the same can be flushed out from time to time.

The modification illustrated in Figures 6, 7, 8, 9 and 10 is similar to that of those heretofore described, and is constructed particularly along the lines of the modification of Figures 3-5. The main drive transmission shaft 200 extends outwardly from the transmission casing 202 into supplemental casing 204 which carries a bearing 206 for the shaft 200. The shaft carries splined thereon a friction disc 208 having friction facings 210 on either side thereof which are adapted to engage a rear face 212 of the transmission housing wall and the face 214 of a "relatively" stationary disc 216. A hollow stud shaft 218 carried by the housing 204 surrounds the shaft 200, and forms a support for a sleeve 220 which is riveted to the disc 216. The stud shaft 218 and the sleeve 220 are provided with adjacent facing soulders 222 and 224 forming a joint annular recess 226 into which a washer 228 jointly bearing against said shoulders is inserted and resiliently held in place by a coil spring 230 also positioned in said annular recess and held in place by a shoulder 232 on the end of the stub shaft.

To slide the friction disc 216 axially into engagement with the rotating disc 208, which incidentally causes said rotating disc to bear against the housing face 212 affording some positive braking effect, there is provided a pair of levers 234 and 236 having conical recesses 238 and 240 with balls 239 jointly interposed therein, and suitable thrust bearings 242 and 244.

The collar 220 has keyed thereto a gear 246 meshed with a sector gear 248 carried on a stub shaft 250. A second sector gear 252 on the shaft 250 engages a sector gear secured to a sector plate 254 pivotally mounted on the sleeve 220. The sector gear 248 is adapted to drive the sector gear 252 only when rotated counterclockwise by reason of the axial interengaging lugs 255 and 256 on the sector gears. Rotation of the sector plate 254 in a clockwise direction tensions the brake operating cable 258 which is secured thereto by means of a clevis 260 having a pin 262 passing through a slot 263 in the sector plate. There is thus provided an actuating means effective for clockwise rotation of the friction discs.

In order to provide for effective actuation during counterclockwise rotation of the friction discs, a second stub shaft 264 is provided which carries a pair of sector gears 266 and 268, the latter meshing with the sleeve gear 246, and the former meshing with an internal sector gear 270 carried by a second sector plate 272 mounted closely adjacent the sector plate 254. The sector gears 266 and 268 have interengaging radial lugs such as suggested in Figure 9, so that sector gear 266 may only drive sector gear 268 when rotating clockwise. The sector plate 272 is likewise provided with a slot for the reception of the clevis pin 262 and is embraced by the clevis 260. Thus rotation of either disc in response to rotations of the friction discs in either direction tension the brake operating cable 258.

Actuation of the brake is accomplished by rotating levers 234 relative to lever 236 by means of a cable 274 which may extend to a brake pedal or the like. Rotation of lever 236 is controlled by engagement of a roller 276 carried thereby with a double cam 278 integrally secured to sector gear 248. A double cam is required since the sector gear 248 must necessarily rotate in either direction, and by providing a cam which will permit lever 236 to turn clockwise as the brake is applied, a follow-up or feel is obtained.

Figure 11:
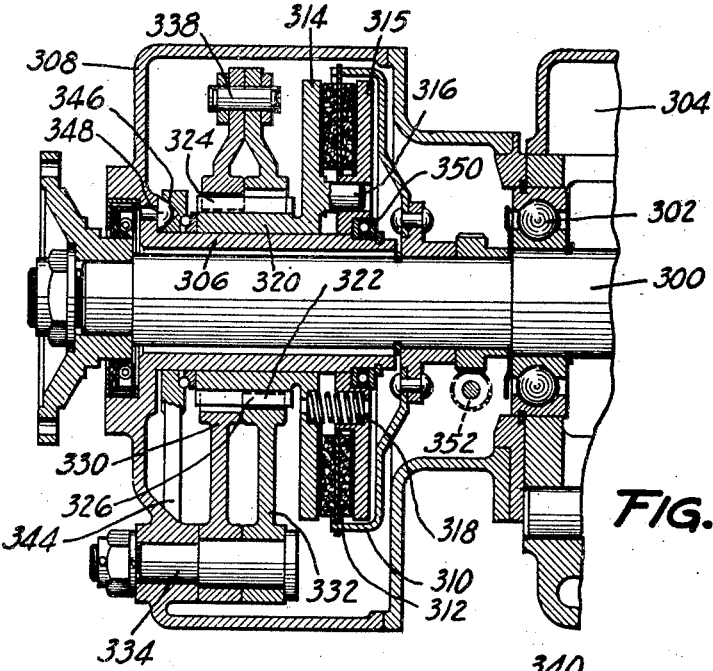
Figure 11 is a longitudinal section taken through a further modified form of power operator, the same also being arranged for coaxial mounting on a transmission shaft.
Figure 12:
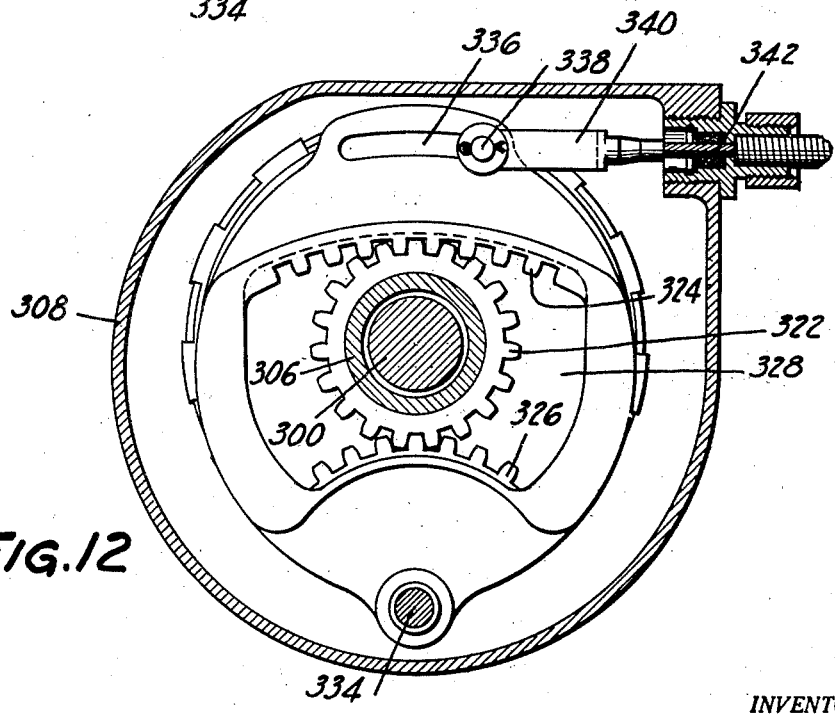
Figure 12 is an end view of the form of Figure 11 with the casing shown in section.
Figure 13:
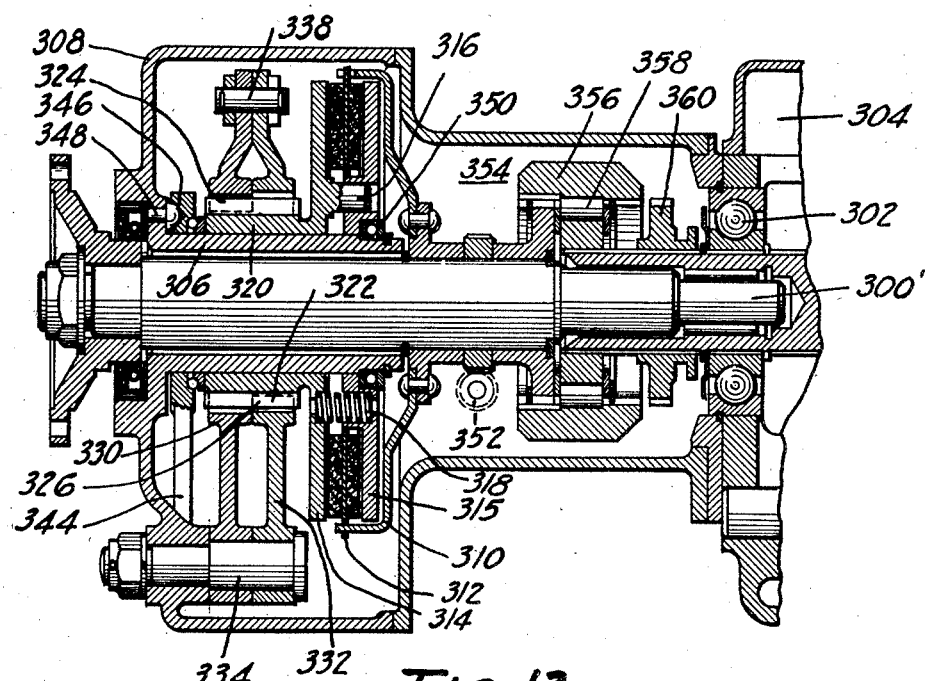
Figure 13 is a longitudinal section similar to Figure 11 but provided with free wheeling.

A further modified form employing the principles of the foregoing modifications is illustrated in Figures 11 and 12 and the modified Figure 13 is adapted for free wheeling. Referring to Figure 11, the transmission drive shaft 300 is provided with a bearing 302 in the rear of the transmission casing 304, and thence extends rearwardly through the hollow stub shaft 306 carried by the supplemental housing 308. A spider 310 driven by the shaft 300 carries an axially movable annular friction disc 312 which is adapted to be frictionally engaged between friction discs 314 and 315 pinned at 316 against relative rotation and provided with springs 318 to normally space the discs apart. A sleeve 320 integrally secured to disc 314 is provided with teeth 322 which are adapted to engage complementary internal and external teeth 324 and 326 arranged in the hollow arcuate recess 328 formed in the sector levers 330 and 332 respectively. Each of the levers are pivoted on a stud 334 secured to the casing, and are provided with overrunning slots 336 engaging a clevis pin 338 and embraced by a clevis 340 attached to an operating cable 342.

Actuation of the brake is accomplished by rotating a lever 344 by any suitable means and providing the same with conical recesses 346 adapted to engage rounded pins 348 in the housing wall. Thrust is thus transmitted through bearing 348, and reaction thrust is received by thrust bearing 350 at the end of the hollow stub shaft.

In Figure 11 a speedometer drive is shown at 352 and in Figure 13 a free wheeling unit 354 comprising a shell 356 splined to shaft 300' and having clutch rollers 358 is shown. A lock-out clutch 360 is shown adapted to engage the internal splines of the shell 356.

Figure 14:
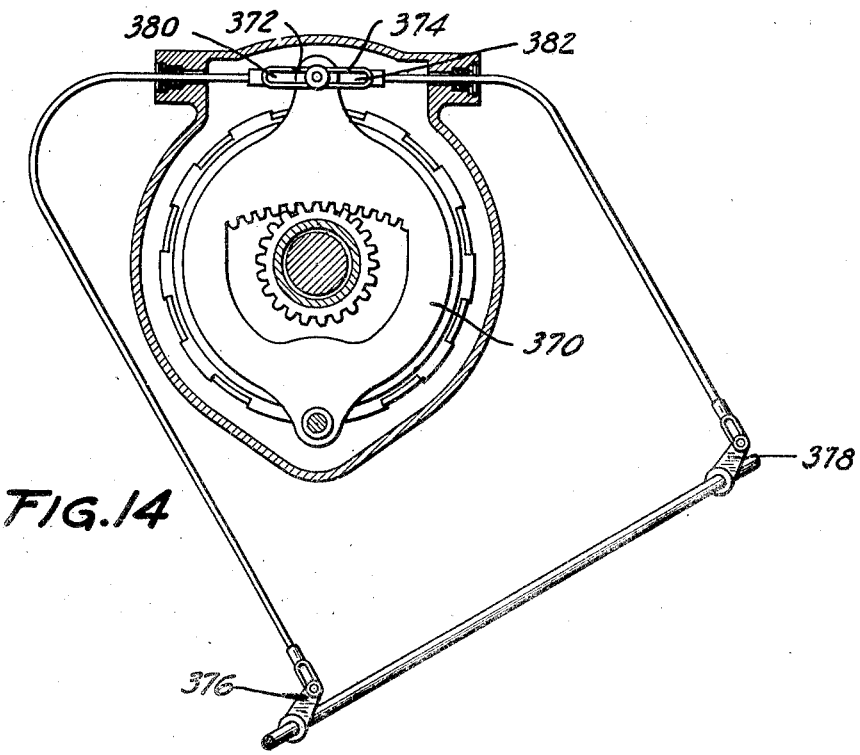
Figure 14 is a slightly modified and simplified form of power take-off of that shown in Figure 11.
Figure 15:
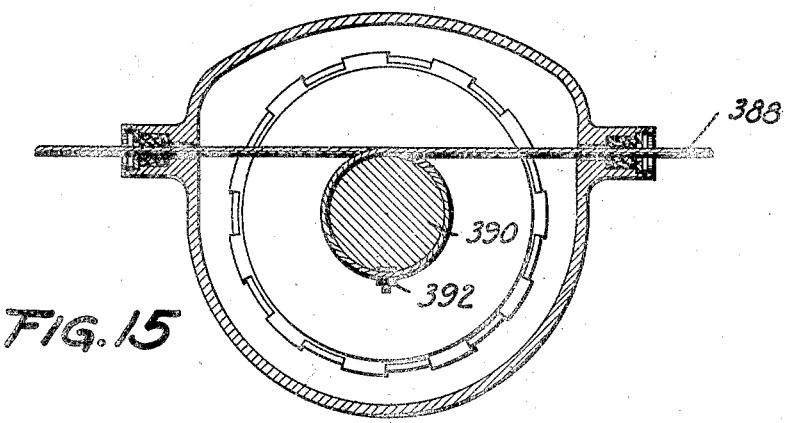
Figure 15 is another modified form of a power take-off readily adaptable to the modification of Figure 11.

In Figure 14, Figure 11 has been modified so as to employ a single sector gear-lever 370 with two clevises 372 and 374 each connected to a similar brake shaft lever 376 and 378, and each clevis being provided with a slot 380 and 382 to permit overrunning. In Figure 15 a simple cable wrap 388 on a drum 390 is shown, the cable being fixed against slippage at 392. The cable being flexible, either end, when connected as shown in Figure 14, may buckle or slacken providing for the requisite lost motion.

Although several embodiments of the invention have been shown and described it is to be understood that the invention is not to be limited thereto, but may be embodied in other mechanical arrangements and forms. As many changes may be made in the construction and arrangement of parts, for example the substitution of equivalent elements in one modification for those in another, as will be apparent to those skilled in the art, reference will be had to the appended claims for a definition of the limits of the invention.

I claim:

1. A mechanical servo brake for automotive vehicles comprising a friction device having a rotatable disc constantly driven by a rotating part of the vehicle, and relatively stationary discs, means for moving said discs axially into engagement with the rotatable disc, said means comprising relatively rotatable coaxial thrust members with aligned conical recesses in their adjacent faces, and balls jointly positioned in said recesses and a fixed support member having spaced thrust shoulders and coaxially supporting said relatively stationary discs and moving means between said shoulders.

2. A mechanical servo brake for automotive vehicles comprising a friction device having a rotatable disc constantly driven by a rotating part of the vehicle, and relatively stationary discs, means for moving said discs axially into engagement with the rotatable disc, said means comprising relatively rotatable coaxial thrust members with aligned conical recesses in their adjacent faces, balls jointly positioned in said recesses, and means associated with said relatively stationary discs for transmitting the torque received thereby to a wheel brake and a fixed support member having spaced thrust shoulders and coaxially supporting said relatively stationary discs and moving means between said shoulders.

3. A mechanical servo brake for automotive vehicles comprising a friction device having a rotatable disc constantly driven by a rotating part of the vehicle, and a relatively stationary disc, means for engaging said discs frictionally, said means comprising relatively rotatable members coaxial therewith, one of said members having a face with eccentric conical recesses, means having a spherical surface associated with the other member adapted to ride in said recesses, whereby relative rotation produces axial spreading and a fixed support member having spaced thrust shoulders and coaxially rotatably supporting said relatively stationary disc and engaging members between said shoulders.

4. A mechanical servo brake for automotive vehicles comprising a friction device having a rotatable disc constantly driven by a rotating part of the vehicle, a relatively stationary disc, means for engaging said discs frictionally, said means comprising relatively rotatable members coaxial therewith, one of said members having a face with eccentric conical recesses, means having a spherical surface associated with the other member adapted to ride in said recesses, a fixed support member having spaced apart thrust shoulders, said support member coaxially rotatably supporting said relatively stationary disc and the members of said engaging means whereby relative rotation between said members produces axial spreading on said support member, and means associated with said relatively stationary disc for transmitting the torque received thereby to a wheel brake.

5. A mechanical servo brake for automotive vehicles comprising a casing, a continuously rotatable shaft extending into said casing, a stationary stub shaft carried by said casing and coaxial with said rotatable shaft, means secured to the rotatable shaft for carrying an annular friction disc, relatively stationary discs on said stub shaft, and means for axially thrusting said discs into engagement with said disc, a crank pin carried by one of said discs, a lever coaxial with said stub shaft adapted to engage said pin during rotation in one direction, an eccentrically mounted crank adapted to engage said pin in reverse rotation, and means for connecting said crank to said lever whereby rotation of the lever is always in the same direction regardless of that of the crank pin.

6. In a mechanical servo brake for automotive vehicles, a transmission casing, a transmission shaft emerging therefrom, a housing around said shaft carrying a stationary hollow stub shaft surrounding said transmission shaft, means on said stub shaft for frictionally engaging rotating means on said transmission shaft, and means for delivering a uni-directional torque from said stub shaft means.

7. In a mechanical servo brake for automotive vehicles, a transmission casing, a transmission shaft emerging therefrom, a housing around said shaft carrying a stationary hollow stub shaft surrounding said transmission shaft, means including discs on said stub shaft for frictionally engaging rotating disc means on said transmission shaft, and means for delivering a uni-directional torque from said stub shaft means, said means including control means for thrusting both of said disc means into varied degrees of engagement.

8. A mechanical servo brake for automotive vehicles comprising a casing, a continuously rotating shaft passing therethrough, a hollow stub shaft secured to said casing and enclosing a portion of said shaft, friction means on said rotating shaft adapted to engage relatively stationary friction means on said hollow stub shaft, a gear on said stub shaft having a crank connection to a wheel brake system, a gear fixed to rock with said relatively stationary friction means, coaxial arranged sector gears in engagement with said first named gears and means for driving one of said sector gears from the other in one direction only.

9. A mechanical servo brake for automotive vehicles comprising a casing, a continuously rotating shaft passing therethrough, a hollow stub shaft secured to said casing and enclosing a portion of said shaft, friction means on said rotating shaft adapted to engage relatively stationary friction means on said hollow stub shaft, a gear on said stub shaft having a crank connection to a wheel brake system, a gear fixed to rock with said relatively stationary friction means, coaxial arranged sector gears in engagement with said first named gears, means for driving one of said sector gears from the other in one direction only, and other means for driving stub shaft gear from one of said sector gears.

10. A mechanical servo brake for automotive vehicles comprising a casing, a continuously rotating shaft passing therethrough, a hollow stub shaft secured to said casing and enclosing a portion of said shaft, friction means on said rotating shaft adapted to engage relatively stationary friction means on said hollow stub shaft, a gear on said stub shaft having a crank connection to a wheel brake system, a gear fixed to rock with said relatively stationary friction means, coaxial arranged sector gears in engagement with said first named gears, means for driving one of said sector gears from the other in one direction only, and other means for driving said stub shaft gear from the sector gear in mesh with said friction gear means.

11. A mechanical servo brake for automotive vehicles comprising a casing, a continuously rotating shaft passing therethrough, a hollow stub shaft secured to said casing and enclosing a portion of said shaft, friction means on said rotating shaft adapted to engage relatively stationary friction means on said hollow stub shaft, a gear on said stub shaft having a crank connection to a wheel brake system, a gear fixed to rock with said relatively stationary friction means, coaxial arranged sector gears in engagement with said first named gears, means for driving one of said sector gears from the other in one direction only, an actuating lever rotatable relative to a second lever, and means associated therewith to axially thrust said rotating friction means into engagement with said relatively stationary frictions means, and means for rocking said second lever in accordance with the rotation of one of the gears.

12. A mechanical servo brake for automotive vehicles comprising a casing, a continuously rotating shaft passing therethrough, a hollow stub shaft secured to said casing and enclosing a portion of said shaft, friction means on said rotating shaft adapted to engage relatively stationary friction means on said hollow stub shaft, a gear on said stub shaft having a crank connection to a wheel brake system, a gear fixed to rock with said relatively stationary friction means, coaxial arranged sector gears in engagement with said first named gears, means for driving one of said sectors gears from the other in one direction only, an actuating lever rotatable relative to a second lever and means associated therewith to axially thrust said rotating friction means into engagement with said relatively stationary friction means, and cam means for rocking said second lever in accordance with the rotation of the sector gear meshed with said stub shaft gear.

13. A mechanical servo brake for automotive vehicles comprising a rotatable friction disc, a rotatable shaft therefor, a stub shaft in alignment therewith, rockable friction means thereon adapted for engagement with said friction disc, a pair of sector plates on said stub shaft having corresponding concentric arcuate slots, common means slidable in the slots and connected to a wheel brake system, and means for rotating one of said sectors in one direction in response to rotation of said rockable means in the same direction and means for rotating the other of said sectors in the same direction in response to rotation of said rockable means in the opposite direction.

14. A mechanical servo brake for automotive vehicles comprising a rotatable friction disc, a rotatable shaft therefor, a stub shaft in alignment therewith, rockable friction means thereon adapted for engagement with said friction disc, a pair of sector plates pivoted eccentric to said stub shaft and having corresponding arcuate slots, common means slidable in the slots and connected to a wheel brake system, and means for rotating one of said sectors in one direction in response to rotation of said rockable means in the same direction and means for rotating the other of said sectors in the same direction in response to rotation of said rockable means in the opposite direction.

LUDGER E. LA BRIE.